(12) United States Patent
Vepari

(10) Patent No.: US 12,275,322 B2
(45) Date of Patent: Apr. 15, 2025

(54) APPARATUS FOR TRANSFERRING ELECTRICAL POWER TO OR FROM AN ELECTRIC VEHICLE, AND CONTROL METHOD THEREOF

(71) Applicant: IPFT Fuels Limited, Surrey (GB)

(72) Inventor: Auroskanda Vepari, Surrey (GB)

( * ) Notice: Subject to any disclaimer, the term of this patent is extended or adjusted under 35 U.S.C. 154(b) by 540 days.

(21) Appl. No.: 17/597,277

(22) PCT Filed: Jul. 3, 2020

(86) PCT No.: PCT/GB2020/051611
§ 371 (c)(1),
(2) Date: Dec. 30, 2021

(87) PCT Pub. No.: WO2021/001662
PCT Pub. Date: Jan. 7, 2021

(65) Prior Publication Data
US 2022/0219558 A1    Jul. 14, 2022

(30) Foreign Application Priority Data
Jul. 4, 2019    (GB) ...................................... 1909650

(51) Int. Cl.
*B60L 53/37*    (2019.01)
*B60L 53/16*    (2019.01)
(Continued)

(52) U.S. Cl.
CPC .............. *B60L 53/37* (2019.02); *B60L 53/16* (2019.02); *B60L 53/305* (2019.02); *H02J 7/00045* (2020.01); *H02J 7/0042* (2013.01)

(58) Field of Classification Search
CPC ........ B60L 53/37; B60L 53/305; B60L 53/16; H02J 7/00045; H02J 7/0042
(Continued)

(56) References Cited

U.S. PATENT DOCUMENTS 7,999,506 B1    8/2011    Hollar et al.
2012/0233062 A1    9/2012    Cornish
(Continued)

FOREIGN PATENT DOCUMENTS

CN    109733236    5/2019
EP    3315351 A2    5/2018
(Continued)

OTHER PUBLICATIONS

United Kingdom Intellectual Property Office, Patent Act 1977: Combined Search and Examination Report under Sections 17 and 18(3), May 31, 2022, United Kingdom.
(Continued)

*Primary Examiner* — Richard V Muralidar
(74) *Attorney, Agent, or Firm* — CIONCA IP Law, P.C.

(57) ABSTRACT

Apparatus for transferring electrical power to or from an electric vehicle, comprises a first connector engageable with a second connector on an electric vehicle, a power circuit configured to transfer electrical power to or from the electric vehicle, one or more sensors configured to detect a current position of the second connector relative to the first connector, an adjustment mechanism configured to adjust a position of the first connector, a controller configured to determine an adjustment required to align the first connector with the second connector in dependence on information received from the one or more sensors, control the adjustment mechanism to align the first and second connectors, and engage the first connector with the second connector once aligned. The first connector is disposed beneath a space in which the electric vehicle may be parked, thereby providing a compact and unobtrusive vehicle charging apparatus.

18 Claims, 3 Drawing Sheets

(51) Int. Cl.
  *B60L 53/30* (2019.01)
  *H02J 7/00* (2006.01)
(58) Field of Classification Search
  USPC .......................................................... 320/109
  See application file for complete search history.

(56) References Cited

U.S. PATENT DOCUMENTS

| | | | |
|---|---|---|---|
| 2017/0008411 A1 | 1/2017 | Wu | |
| 2017/0182903 A1 | 6/2017 | Kwasnick et al. | |
| 2017/0225583 A1 | 8/2017 | Chai et al. | |
| 2018/0015836 A1 | 1/2018 | Madon | |
| 2018/0056799 A1* | 3/2018 | Namou | B60L 58/20 |
| 2018/0236889 A1* | 8/2018 | Masuda | B60L 53/126 |
| 2019/0176633 A1* | 6/2019 | Booth | B60L 53/60 |

FOREIGN PATENT DOCUMENTS

| | | |
|---|---|---|
| GB | 2468578 A | 4/2010 |
| GB | 2510125 | 7/2014 |
| GB | 2523186 | 8/2015 |
| JP | 2009278711 | 11/2009 |
| JP | 2012034562 | 2/2012 |
| JP | 2012100519 | 5/2012 |
| JP | 2013218679 | 10/2013 |
| JP | 2016141161 | 8/2016 |
| JP | 2018074777 | 5/2018 |
| WO | 2018151662 A1 | 8/2018 |

OTHER PUBLICATIONS

Combined search and examination report under Sections 17 and 18(3), GB Intellectual Property Office, issued Dec. 19, 2023.
Substantive Report, issued by Saudi Authority for Intellectual Property, date of issue Feb. 25, 2024.
Substantive Report, issued by Saudi Authority for Intellectual Property, date of issue May 16, 2024.
Notice of Refusal, issued by Japan Patent Office, date of issue Jun. 4, 2024.
Notice of Opinion Submission, issued by Korean Intellectual Property Office, date of issue Aug. 1, 2024.

* cited by examiner

APPARATUS FOR TRANSFERRING ELECTRICAL POWER TO OR FROM AN ELECTRIC VEHICLE, AND CONTROL METHOD THEREOF

TECHNICAL FIELD

The present invention relates to apparatus for transferring electrical power to or from an electric vehicle, and to a control method thereof.

BACKGROUND

Electric vehicles can provide a more environmentally-friendly alternative to vehicles that rely on other forms of propulsion, such as petrol and diesel engines. The popularity of electric vehicles has increased significantly in recent years. However, some consumers may be deterred from adopting electric vehicles due to concerns over availability of charging points at which a battery of the electric vehicle can be recharged.

One drawback of existing charging points is the cabinet that houses the associated hardware, which is typically similar in size to a conventional petrol or diesel pump. In an urban environment it may not be possible to install charging points in areas with limited kerbside space, for example narrow residential streets. This drawback can deter homeowners and local authorities from installing new charging points, which in turn may delay the widespread adoption of electric vehicles.

The invention is made in this context.

SUMMARY OF THE INVENTION

According to a first aspect of the present invention, there is provided apparatus for transferring electrical power to or from an electric vehicle, comprising: a first connector engageable with a second connector on an electric vehicle, the first connector being disposed beneath a space in which the electric vehicle may be parked; one or more sensors configured to detect a current position of the second connector relative to the first connector; an adjustment mechanism configured to adjust a position of the first connector; a controller configured to receive information from the one or more sensors indicative of the current position of the first connector relative to the second connector, determine an adjustment required to align the first connector with the second connector in dependence on the information received from the one or more sensors, control the adjustment mechanism in accordance with the determined adjustment to align the first and second connectors, and engage the first connector with the second connector once aligned to thereby make an electrical connection for transferring electrical power to or from the electric vehicle; and a power circuit configured to transfer electrical power to or from the electric vehicle via said electrical connection.

In some embodiments according to the first aspect, one or more of the controller, power circuit, adjustment mechanism and one or more sensors are disposed beneath a ground level of the space in which the electric vehicle may be parked.

In some embodiments according to the first aspect, the apparatus comprises a connector housing in which the first connector is installed, wherein an uppermost surface of the connector housing is disposed at or below a ground level of the space in which the electric vehicle may be parked.

In some embodiments according to the first aspect, the one or more sensors are disposed so as to capture an image of the underside of the electric vehicle when the electric vehicle is situated in the space above the first connector.

In some embodiments according to the first aspect, the controller is configured to use a machine learning algorithm to assign the captured image to one of a plurality of image classes each corresponding to a different position of the second connector in the captured image, and is configured to determine the required adjustment by retrieving a stored predetermined adjustment associated with the assigned image class.

In some embodiments according to the first aspect, the apparatus is configured to transmit the captured image to the electric vehicle in which the electric vehicle is being parked in the space above the first connector, to assist a user of the electric vehicle in approximately aligning the second connector with the first connector.

In some embodiments according to the first aspect, the captured image comprises an image captured at visible wavelengths, or an infrared image, or an ultrasound image.

In some embodiments according to the first aspect, the apparatus is configured to transmit information indicative of a range of the adjustment mechanism to the electric vehicle.

In some embodiments according to the first aspect, the information indicative of a range of the adjustment mechanism comprises a bounding box overlaid on the captured image to indicate an area within which the first connector is capable of being positioned by the adjustment mechanism.

In some embodiments according to the first aspect, the controller is configured to determine whether the electric vehicle is positioned such that the second connector is beyond a range of the adjustment mechanism, and is configured to transmit a misalignment notification message to the electric vehicle in dependence on a determination that the second connector is beyond a range of the adjustment mechanism.

In some embodiments according to the first aspect, the apparatus comprises means for detecting and/or removing an obstruction from a path between the first and second connectors.

In some embodiments according to the first aspect, the first connector is configured to be extendable in a first direction towards the second connector to engage the first connector with the second connector, and the adjustment mechanism is configured to move the first connector in a plane inclined with respect to the first direction to adjust the position of the first connector.

In some embodiments according to the first aspect, the electric vehicle is an automobile.

In some embodiments according to the first aspect, the controller is configured to determine whether a vehicle parked in the space above the first connector is compatible with the first connector, and to automatically take an action in response to a determination that the vehicle is incompatible with the first connector.

In some embodiments according to the first aspect, the controller is configured to analyse an image captured by the one or more sensors to determine whether the vehicle is an internal combustion engine vehicle, and is configured to determine that the vehicle is incompatible with the first connector in dependence on a determination that the vehicle is an internal combustion engine vehicle.

In some embodiments according to the first aspect, the controller is configured to apply an image recognition algorithm to the image captured by the one or more sensors to detect one or more features indicative of an internal combustion engine vehicle.

In some embodiments according to the first aspect, the one or more sensors include an air sensor for detecting a characteristic of air, and the controller is configured to determine that the vehicle is incompatible with the first connector in dependence on the air sensor detecting a characteristic indicative of an exhaust emission of an internal combustion engine vehicle.

In some embodiments according to the first aspect, the action comprises one or more of: activating an alarm; automatically issuing a parking violation notice; and alerting an authority to the presence of an incompatible vehicle in the space.

According to a second aspect of the present invention, there is provided apparatus for transferring electrical power to or from an electric vehicle, comprising: memory arranged to store computer program instructions; and one or more processors configured to execute the computer program instructions stored in the memory, wherein when executed by the one or more processors, the computer program instructions are adapted to cause the apparatus to: receive information from one or more sensors indicative of the current position of a first connector relative to a second connector disposed on an electric vehicle, the first connector being engageable with the second connector; determine an adjustment required to align the first connector with the second connector in dependence on the information received from the one or more sensors; control an adjustment mechanism configured to adjust a position of the first connector, in accordance with the determined adjustment to align the first and second connectors; engage the first connector with the second connector once aligned to thereby make an electrical connection for transferring electrical power to or from the electric vehicle; and transfer electrical power to or from the electric vehicle via said electrical connection, using the power circuit.

According to a third aspect of the present invention, there is provided a control method of an electric vehicle charging apparatus comprising a first connector engageable with a second connector on an electric vehicle, the first connector being disposed beneath a space in which the electric vehicle may be parked, one or more sensors configured to detect a current position of the second connector relative to the first connector, an adjustment mechanism configured to adjust a position of the first connector, and a power circuit configured to transfer electrical power to or from the electric vehicle, the method comprising: receiving information from the one or more sensors indicative of the current position of the first connector relative to the second connector; determining an adjustment required to align the first connector with the second connector in dependence on the information received from the one or more sensors; controlling the adjustment mechanism in accordance with the determined adjustment to align the first and second connectors; engaging the first connector with the second connector once aligned to thereby make an electrical connection for transferring electrical power to or from the electric vehicle; and transferring electrical power to or from the electric vehicle via said electrical connection, using the power circuit.

According to a fourth aspect of the present invention, there is provided computer program comprising instructions which, when executed by one or more processors, cause performance of a method according to the second aspect.

According to a fifth aspect of the present invention, there is provided a non-volatile computer-readable storage medium having stored thereon a computer program according to the fourth aspect.

BRIEF DESCRIPTION OF THE DRAWINGS

Embodiments of the present invention will now be described, by way of example only, with reference to the accompanying drawings, in which.

DETAILED DESCRIPTION

Figure 1:
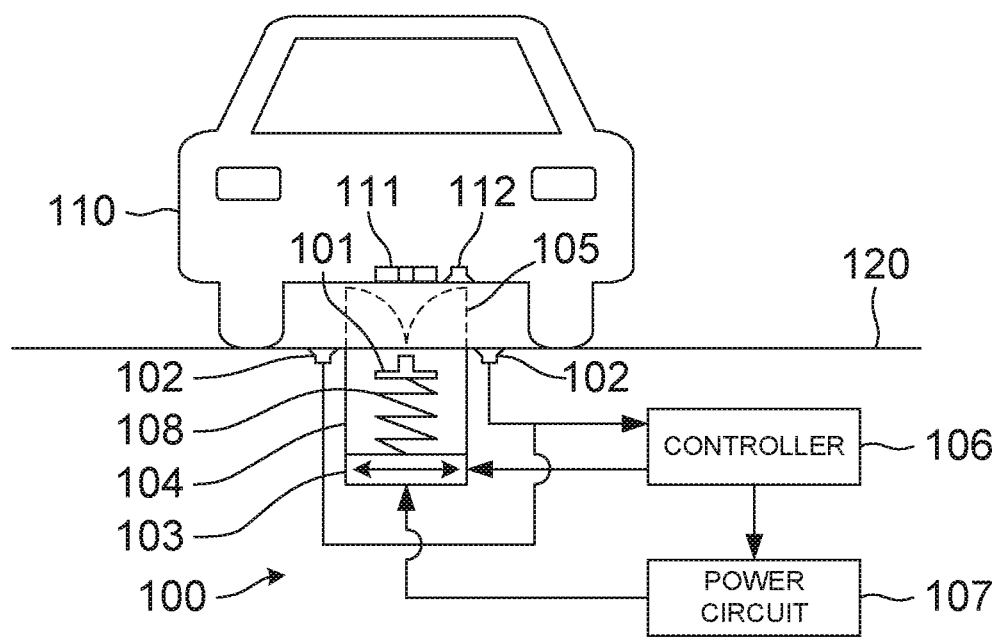
FIG. 1 illustrates an apparatus for transferring electric power to or from an electric vehicle, according to an embodiment of the present invention.

In the following detailed description, only certain exemplary embodiments of the present invention have been shown and described, simply by way of illustration. As those skilled in the art would realize, the described embodiments may be modified in various different ways, all without departing from the scope of the present invention. Accordingly, the drawings and description are to be regarded as illustrative in nature and not restrictive. Like reference numerals designate like elements throughout the specification.

Referring now to FIG. 1, an apparatus for transferring electric power to or from an electric vehicle is illustrated, according to an embodiment of the present invention. The apparatus 100 comprises a first connector 101 configured to be engageable with a second connector 111 on an electric vehicle 110. In the present embodiment the electric vehicle 110 is an automobile, for example an electric car, but in other embodiments the apparatus may be configured for use with other types of vehicle, such as aircraft or sea vessels. The apparatus 100 further comprises one or more sensors 102 for detecting a position of the second connector 111, an adjustment mechanism 103, a housing 104, a housing cover 105, a controller 106, and a power circuit 107.

As shown in FIG. 1, the first connector 101 is disposed beneath a space in which the electric vehicle 110 may be parked. In some embodiments the space may be delimited by suitable markings on the grounds, for example when the apparatus 100 is installed in a marked parking bay in a car park or alongside a road. The first connector 101 may be disposed within the space delimited by the markings, such that the markings act as a guide to assist a driver in parking the vehicle 110 above the first connector 101. In other embodiments the space may be unmarked, for example when the apparatus 100 is installed on a private driveway at a user's home, or in a private garage.

The one or more sensors 102 are configured to detect a current position of the second connector 111 relative to the first connector 101, and to transmit information indicative of the current position of the first connector 101 relative to the second connector 111. The one or more sensors 102 may be configured to detect when the vehicle 110 is being or has been parked in the space above the first connector 101, and to automatically transmit the information to the controller 106 when the presence of the vehicle 110 is detected. Any suitable type of sensor 102 that is capable of detecting a position of the second connector 111 may be used, depending on the embodiment. For example, the one or more sensors 102 may comprise a camera configured to capture an image of the second connector 111 at visible wavelengths, and/or may comprise an infrared sensor or an ultrasound sensor. In the present embodiment, the one or more sensors 102 are disposed so as to capture an image of the underside of the electric vehicle 110 when the electric vehicle 110 is situated in the space above the first connector 101.

In some embodiments the second connector 111, and/or an enclosure in which the second connector 111 is housed on the vehicle 110, is configured so as to provide a high contrast with a part of the vehicle adjacent to the second connector 111 and/or the enclosure of the second connector 111, so that the controller 106 can more easily locate is the second connector 111 in an image captured by the one or more sensors 102. For example, when the one or more sensors 102 are configured to capture an image at visible wavelengths, the second connector 111 and/or the enclosure may have a colour that provides a high contrast with the colour of an adjacent part of the vehicle. As another example, instead of using a different colour, another property of the second connector 111 and/or its enclosure, such as the shape and/or surface reflectance, may be configured to produce a high contrast in the image captured by the one or more sensors 102.

The controller 106 is configured to receive the information indicative of the current position of the first connector 101 relative to the second connector 111 from the one or more sensors 102, and to determine an adjustment required to align the first connector 101 with the second connector 111 in dependence on the information received from the one or more sensors 102. The controller 106 can use the adjustment mechanism 103 to adjust a position of the first connector 101 in accordance with the determined adjustment, so as to align the first connector 101 with the second connector 111 and allow the first connector 101 to be engaged with the second connector 111. In some embodiments the adjustment mechanism 103 may be configured to move the first connector 101 linearly along one or more axes, and/or may be configured to rotate the first connector 101 about one or more axes. For example, in one embodiment the adjustment mechanism 103 comprises a moveable platform on which the first connector 101 is mounted, and comprises actuating means for moving the platform along one or more axes. Examples of suitable actuating means include, but are not limited to, an electric motor connected to a rack and pinion mechanism, or a hydraulic ram. In some embodiments, the adjustment mechanism may be configured to raise or lower, and/or rotate, the housing 104 containing the first connector 101. For example, the adjustment mechanism may raise or lower the housing 104 in a similar manner to a rising bollard. The engagement mechanism may then comprise an arm that extends out from the housing 104 once the housing 104 is in a raised position.

By providing an adjustment mechanism 103 in the charging point apparatus 100, the cost and complexity of the corresponding connector 111 on the vehicle 110 can be reduced, since any necessary adjustment can be performed by the charging point 100. Furthermore, by allowing the position of the first connector 101 to be adjusted to match the position of the second connector 111 on the vehicle 110, the apparatus 100 can compensate for a certain degree of misalignment of the first and second connectors 101, 111, making the parking operation easier for the driver since it may not be necessary to accurately align the second connector 111 with the first connector 101 when parking the vehicle 110.

Once engaged, the first and second connectors 101, 111 make an electrical connection via which the power circuit 107 can transfer electrical power to or from the vehicle 110. For example, one of the first and second connectors 101, 111 may comprise a plug and the other one of the first and second connectors 101, 111 may comprise a socket having a complimentary shape to the plug, such that the plug can be retained in the socket using friction or mechanical means to provide a secure connection. The first connector 101 may be referred to as a 'charging point connector', and the second connector 111 may be referred to as a 'vehicle connector'. The controller 106 may control the power circuit to control the speed, time and duration of the transfer of power to or from the electric vehicle 110. In some embodiments the controller 106 may control the power circuit 107 to only supply electrical power to the vehicle 110 at certain times of day, for example when demand on the grid is low and/or when the cost of electricity is lower. Conversely, at times when the cost of electricity is higher, in some embodiments the power circuit 107 may be controlled to transfer power from the vehicle 110 to the grid.

The first connector 101 is mounted on an engagement mechanism 108 that is configured to move the first connector 101 in a direction towards the second connector 111, so as to engage the first and second connectors 101, 111. Examples of suitable mechanisms for engaging the first connector 101 include, but are not limited to, a telescoping column, linear actuator, or a robotic arm capable of making independent adjustments on x, y and z Cartesian axes. In some embodiments, adjustment mechanism 103 is configured to move the first connector 101 within a plane, and the engagement mechanism 108 is configured to move the first connector 101 in a direction that is inclined with respect to the plane of the adjustment mechanism 103. In this way, by combining movements of the adjustment mechanism 103 and the engagement mechanism 108, the first connector 101 can be accurately positioned with at least three degrees of freedom in space.

After adjusting the position of the first connector 101 using the adjustment mechanism 108, the controller 106 may receive new information from the one or more sensors 102 and confirm that the first and second connectors 101, 111 are correctly aligned. Then, in dependence on a determination that the first and second connectors 101, 111 are aligned, the controller 106 may control the engagement mechanism 108 to automatically engage the first connector 101 with the second connector 111.

The controller 106 may be configured to control the engagement mechanism 108 to automatically disengage the first connector 101 from the second connector 111 once charging has been completed. For example, the electric vehicle 110 may monitor the state of charge of its internal battery, and transmit a signal to the controller 106 which indicates that the battery is fully charged. In some embodiments, the electric vehicle 110 may transmit the signal to the controller 106 when the battery charge reaches a certain threshold level below 100% charge. For example, if the user has selected a fast charging mode, the electric vehicle 110 may transmit the signal to the controller 106 to terminate the charging operation once the battery reaches a certain level of charge, for example 80% or 90% of the total battery capacity. The controller 106 may be configured to disengage the first connector 101 from the second connector 111 in response to a user command, to allow a driver to interrupt the charging process and continue their journey at a time of their choosing.

In some embodiments the charging operation may be terminated once the level of battery charge reaches a threshold defined by a user, which may be referred to as a user-defined threshold. For example, a user may set the user-defined threshold at a level that they consider to represent an adequate amount of charge for the remaining part of their current journey. In some embodiments, the charging operation may be terminated once the level of battery charge reaches a threshold that is determined by an algorithm configured to predict an amount of battery charge required to complete a remaining part of the current journey. The algorithm may be configured to take into account information such as the user's expected driving pattern and/or their most likely destination when making the prediction. For example, the algorithm may be provided with information indicative of previous journeys carried out by the user, and/or information indicative about the user's driving style (e.g. rates of acceleration and/or braking, cornering speeds, preference for certain gears at certain speeds, etc.).

In the present embodiment the second connector 111, which may also be referred to as a vehicle connector, is disposed on an underside of the electric vehicle 111. However, in other embodiments the second connector 111 may be disposed on another part of the vehicle 111, for example on the side, front, rear, or top of the vehicle 111. In embodiments in which the second connector 111 is disposed on part of the vehicle other than the underside of the vehicle, the adjustment mechanism 103 and/or the engagement mechanism 108 may be adapted accordingly. For example, in an embodiment in which the second connector 111 is disposed on the side of the vehicle 110, the adjustment mechanism 103 may comprise a robotic arm configured to move the first connector 101 horizontally out from underneath the vehicle 110, and raise the first connector 101 vertically alongside the vehicle no until it is at the same height as the second connector 111. The arm may then be controlled to move the first connector 101 horizontally towards the second connector 111 to engage the first and second connectors 101, 111. In this embodiment, the robotic arm performs the functions of both the adjustment mechanism 103 and the engagement mechanism 108, and a separate engagement mechanism 108 may not be required.

As a further example, in some embodiments the housing 104 and one or more sensors 102 may be disposed on one side of the parking space, and the adjustment mechanism 103 may be configured to raise or lower the housing 104. For example, the adjustment mechanism 103 may raise or lower the housing 104 using a similar mechanism to a rising bollard, such that the first connector 101 is raised to a position alongside the vehicle 110. The adjustment mechanism 103 may be configured to rotate the housing 104 to ensure that the first connector 101 is on the same side of the housing 104 as the vehicle 110. The engagement mechanism 108 may then extend the first connector 101 out from the housing 104, for example in a horizontal direction, to engage the first connector 101 with the second connector 111. Such embodiments may be particularly suited for vehicles no in which the second connector 111 is disposed on the side of the vehicle 110.

As shown in FIG. 1, in the present embodiment the controller 106, power circuit 107, adjustment mechanism 103 and one or more sensors 102 are disposed beneath ground level 120. In this way, a compact and unobtrusive charging point apparatus 100 can be provided that does not pose any obstruction to pedestrians or road users at street level 120. This may be particularly advantageous for pedestrians with reduced or impaired mobility, such as the visually challenged, elderly, differently abled pedestrians, or other users of sidewalks suffering from injury or in a medical emergency, all of whom may find it difficult to navigate around obstructions posed by conventional above-ground electric vehicle charging points. However, in some embodiments one or more of the controller 106, power circuit 107, adjustment mechanism 103 and one or more sensors 102 may be disposed above ground level.

Additionally, in the present embodiment the connector housing 104 is disposed such that an uppermost surface of the housing 104 is at or below the ground level 120 of the space in which the electric vehicle no may be parked. For example, the housing 104 may be installed flush with the ground level 120, that is to say, the uppermost surface of the housing 104 and the road surface 120 may present a substantially flat and level surface such that vehicles no may drive directly over the housing 104 without difficulty. In other embodiments, the housing 104 may be installed such that a part or the whole of the housing 104 is above ground level 120. This may be beneficial in situations where it is not possible to fully recess the housing 104 into the ground, for example due to the presence of utility services or other obstructions below ground level.

In some embodiments the vehicle no may comprise one or more vehicle sensors 112 configured to detect a position of part of the apparatus 100, such as the first connector 101, and/or the housing 104, and/or the housing cover 105, relative to the second connector 111. Information from the one or more vehicle sensors 112 may be used to assist in aligning the first and second connectors 101, 111. For example, in some embodiments the vehicle no may transmit information obtained from the one or more vehicle sensors 112 to the charging point controller 106. In some embodiments, a controller on the vehicle no may make use of the information obtained from the one or more vehicle sensors 112 to assist in automatically aligning the first and second connectors 101, 111, for example during an autonomous parking operation, and/or may display information obtained from the one or more vehicle sensors 112 to assist a user in aligning the first and second connectors 101, 111 during a manual parking operation.

In embodiments in which one or more vehicle sensors 112 are provided, the part of the apparatus 100 that is detected by the one or more vehicle sensors 112 may be configured so as to provide a high contrast with an adjacent part of the apparatus 100, and/or to provide a high contrast with an adjacent part of the road surface 120. That is, the part of the apparatus 100 that is detected by the one or more vehicle sensors 112 may be configured so as to provide a high contrast in an image captured by the one or more vehicle sensors 112, so that the part of the apparatus 100 can be more easily located in the captured image. For example, when the one or more vehicle sensors 112 are configured to capture an image at visible wavelengths, the part of the apparatus 100 may have a colour that provides a high contrast with the colour of an adjacent part of the apparatus 100 and/or an adjacent part of the road surface 120. As another example, instead of using a different colour, another property of the part of the apparatus 100, such as the shape and/or surface reflectance, may be configured to produce a high contrast in the image captured by the one or more vehicle sensors 112.

The apparatus 100 of the present embodiment comprises a housing cover 105 in the form of one or more parts that can pivot about suitable hinges. When in a closed position, the one or more parts of the housing cover 105 can act as a seal to prevent dirt, liquid or other foreign matter from entering the housing 104. Additionally, when lifted into an open position as shown by the dashed lines in FIG. 1, any dirt, debris or other material that might otherwise obstruct the first connector 101 can be tipped off of the housing cover 105, clearing a path for the first connector 101 to be engaged with the second connector 111. In this way, the hinged one or more parts of the housing cover 105 can act as means for removing an obstruction from the path between the first and second connectors 101, 111.

Although in the present embodiment the housing cover 105 takes the form of a hinged lid over the housing 104, in other embodiments a different form of cover 105 may be provided. For example, in some embodiments a rigid housing cover 105 may open and close using a sliding or rotating mechanism, or a flexible or segmented housing cover in the form of a shutter may be opened by rolling the housing cover about a drum or spindle on one side of the housing 104.

In some embodiments a different means for removing the obstruction may be provided, instead of or in addition to a hinged housing cover 105. The means for removing an obstruction may also be referred to as a path clearing mechanism. For example, in some embodiments the apparatus may comprise a path clearing mechanism in the form of a nozzle configured to direct a jet of gas or liquid across the surface of the housing 104 so as to clear material away from the surface of the housing 104 and clear a path for the first connector 101.

Figure 2:
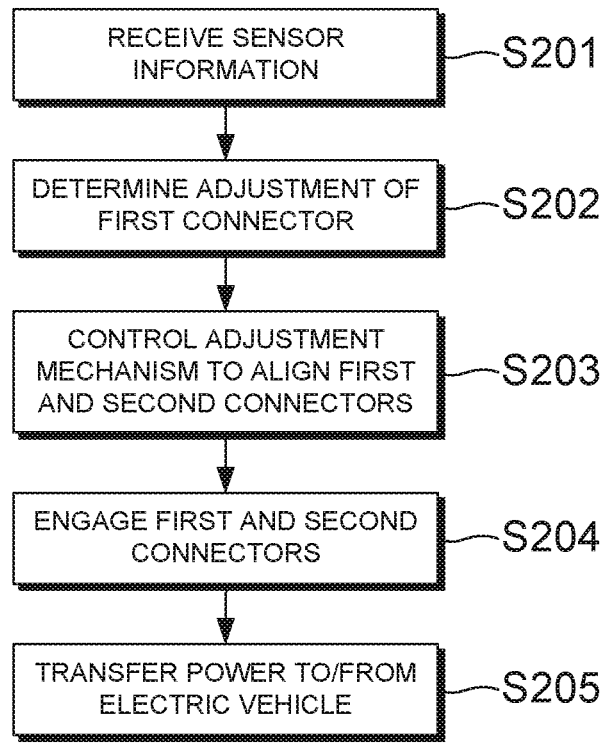
FIG. 2 is a flowchart illustrating a control method of the apparatus shown in FIG. 1, according to an embodiment of the present invention.

Referring now to FIG. 2, a flowchart is illustrated showing a control method of the charging apparatus, according to an embodiment of the present invention. A method such as the one shown in FIG. 2 may be performed by apparatus similar to the one shown in FIG. 1.

First, in step S201 the controller 106 receives information from the one or more sensors 102 indicative of the current position of the first connector 101 relative to the second connector 111, for example in the form of an image of the underside of the vehicle 110 showing a position of the second connector 111. Then, in step S202 the controller 106 determines the adjustment that is required to align the first connector 101 with the second connector 111 in dependence on the information received from the one or more sensors 102, for example by applying a shape recognition algorithm to identify the second connector 111 within the image and then determining an offset between the current position of the second connector 111 and a known reference point.

Once the necessary adjustment has been determined, in step S203 the controller 106 controls the adjustment mechanism 103 in accordance with the determined adjustment to align the first and second connectors 101, 111. Then, in step S204 the controller 106 controls the engagement mechanism 108 to engage the first connector 101 with the second connector 111 once the connectors 101, 111 have been aligned, so as to make the electrical connection for transferring electrical power to or from the electric vehicle 110. Then, in step S205 the power circuit 107 begins transferring electrical power to or from the electric vehicle 110 via the electrical connection between the first and second connectors 101, 111.

As explained above, by adjusting the position of the first connector 101 relative to the second connector 111 at the apparatus 100, it may not be necessary for the vehicle 110 to be parked with a high degree of accuracy with respect to the first connector 101.

Furthermore, since the necessary adjustment can be carried out at the apparatus 100 rather than on the vehicle 110, a simple fixed connector 111 on the vehicle 110 may be provided, reducing the overall cost and complexity of the vehicle 110.

Nevertheless, in some embodiments the vehicle 110 may also comprise its own mechanism for adjusting the position of the second connector 111. When both the apparatus 100 and the vehicle 110 each comprise mechanisms for adjusting the positions of the first and second connectors 101, 111, respectively, a greater range of adjustment may be possible and accordingly the system may be able to tolerate a greater degree of misalignment between the apparatus 100 and the vehicle 110.

Figure 3:
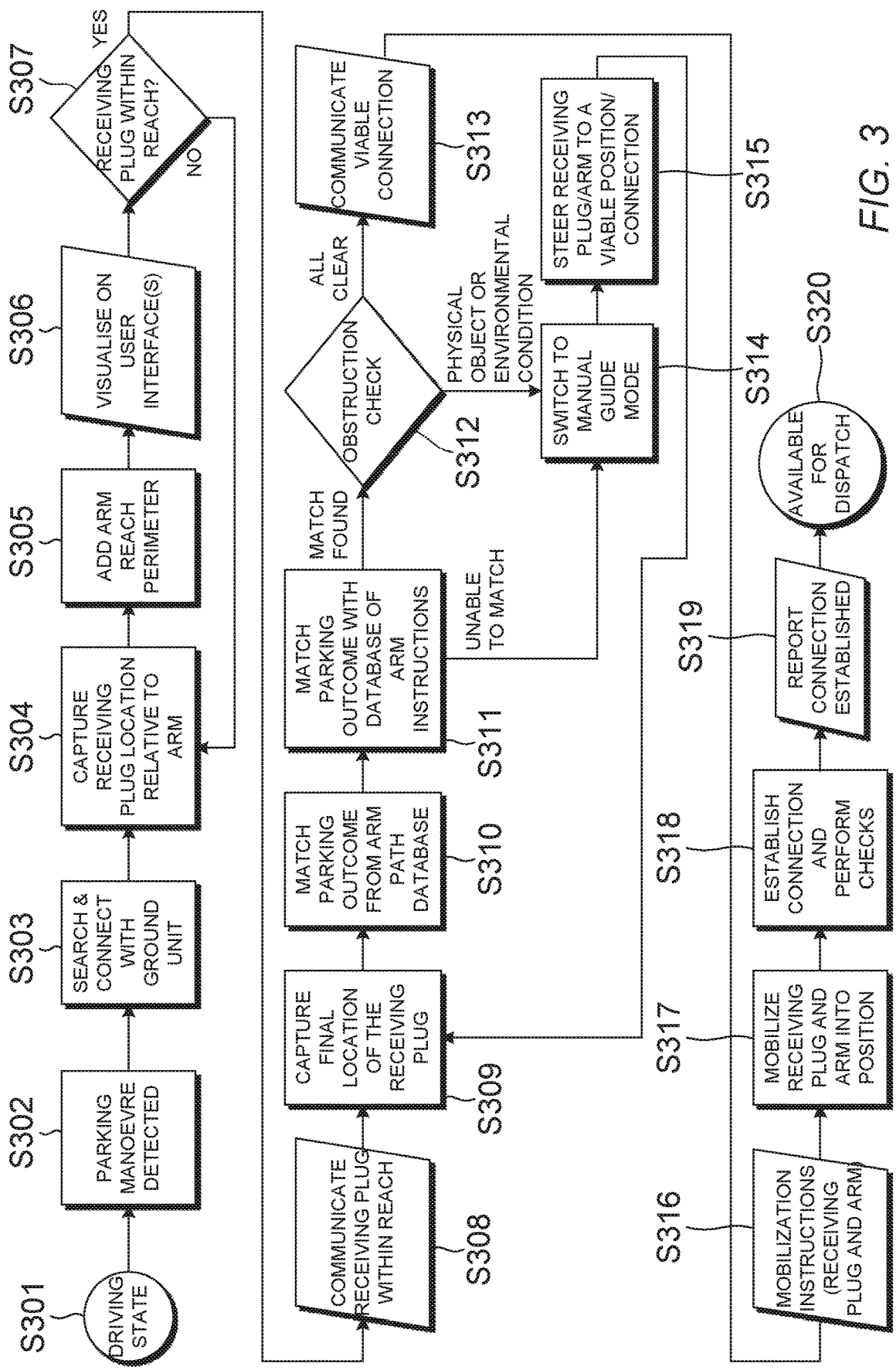
FIG. 3 is a flowchart illustrating a method of aligning and engaging the first and second connectors of the apparatus shown in FIG. 1, according to an embodiment of the present invention.

Referring now to FIG. 3 a flowchart is illustrated showing a method of aligning and engaging the first and second connectors of the apparatus shown in FIG. 1, according to an embodiment of the present invention. As will become apparent from the following description, certain steps illustrated in FIG. 3 are performed at the apparatus 100 and other steps are performed at the vehicle 110.

The flowchart in FIG. 3 starts with the vehicle 110 in a driving state in step S301. At some point the vehicle 110 detects a parking manoeuvre in step S302, for example when the user selects reverse gear, or chooses to activate the vehicle's parking sensors and/or engages an autonomous parking function. A controller onboard the vehicle 110 responds in step S303 by wirelessly searching for and attempting to connect to a ground-based charging apparatus, such as the one shown in FIG. 1, in the immediate vicinity of the vehicle 110. For the sake of clarity, a controller onboard the vehicle 110 will hereinafter be referred to as the 'vehicle controller', and the controller 106 of the charging point apparatus 100 will hereinafter be referred to as the charging point controller 106. Depending on the embodiment, the vehicle controller may comprise an electronic control unit (ECU) installed in the vehicle, or may comprise a physically separate device, for example a portable user device such as a tablet computer or smartphone. The vehicle controller may attempt to establish a wireless connection to the apparatus 100 using any suitable technology, for example WiFi, Long Range (LoRa) or Bluetooth.

Once a connection is established, the vehicle controller receives an image from the one or more sensors 102 of the ground-based charging point apparatus 100 in step S304, for example an image captured at visible wavelengths, or an infrared image, or an ultrasound image. In step S305, the vehicle controller obtains information indicative of a range of the adjustment mechanism 103 from the charging point controller 106. For example, the information transmitted by the charging point controller 106 to the vehicle controller in step S305 may define the maximum range of adjustment that is possible along one or more predefined axes with respect to the first connector 101.

Next, in step S306 the vehicle controller displays a whole or part of the image received in step S304 on a display visible to the driver, for example a dash-mounted display screen, or a display screen of a mobile user device such as a tablet computer or smartphone handset. In the present embodiment, the displayed image includes a bounding box overlaid on the image captured by the one or more sensors 102 to indicate an area within which the first connector 101 is capable of being positioned by the adjustment mechanism 103. Depending on the embodiment, the bounding box may be added to the captured image by the charging point controller 106 and then transmitted to the vehicle controller, or may be added by the vehicle controller after receiving the captured image in step S304, before displaying the image including the bounding box on the display visible to the driver.

In step S307 the vehicle controller checks whether the second connector 111 is within reach of the first connector 101. That is, the vehicle controller may check whether the second connector 111 is within the range of possible adjustments that can be provided by the adjustment mechanism 103. If the vehicle controller determines that the second connector 111 is out of range of the adjustment mechanism 103 and the first connector 101, then a misalignment notification message may be displayed to prompt the driver to manoeuvre the vehicle 110 into a different position. When doing so, the driver may use the displayed image and the bounding box to assist them in approximately aligning the second connector 111 with the first connector 101. In some embodiments, in step S307 the vehicle controller may automatically reposition the vehicle without driver involvement, using an autonomous parking mode.

Once it is determined that the second connector 111 is within reach of the first connector 101, in step S308 the vehicle controller signals to the charging point controller 106 that the vehicle 110 is correctly parked. Then, in step S309 the charging point controller 106 captures an image of the current location of the second connector 111 using the one or more sensors 102. Next, in the present embodiment the charging point controller 106 analyses the captured image using a machine learning algorithm in step S310. The machine learning algorithm is configured to assign the captured image to one of a plurality of image classes, each class corresponding to a different position of the second connector 111 in the captured image. If the machine learning algorithm succeeds in assigning the image to one of the classes, then the charging point controller 106 proceeds to determine the required adjustment in step S311 by retrieving a stored predetermined adjustment associated with the assigned image class. By pre-calculating the necessary adjustments for different scenarios and storing the pre-calculated adjustments in memory, the charging point controller 106 can quickly and efficiently determine the necessary adjustment in step S311. Also, by retrieving a stored predetermined adjustment appropriate to the current scenario in terms of a relative positioning of the first and second connectors 101, 111, the controller 106 can control the adjustment mechanism 103 without having to rely on information from the one or more sensors 102 to guide the adjustment in real-time.

Next, in step S312 the charging point controller 106 checks whether any obstructions are present in the path between the first and second connectors 101, in, for example based on information received from the one or more sensors. If an obstruction is detected in step S312, or if the machine learning is unable to classify the image in step S311, then the charging point controller 106 signals to the vehicle controller to switch to a manual mode in which a human operator, for example the driver or a passenger, provides user input to manually control the adjustment mechanism 103 and/or engagement mechanism 108 in step S315. For example, a user interface for controlling the adjustment mechanism 103 and/or engagement mechanism 108 may be displayed on a touchscreen display in the vehicle, and the vehicle controller may transmit user commands received through the user interface to the charging point controller 106, which in turn can control the adjustment mechanism 103 and/or engagement mechanism 108 according to the user commands.

Once the charging point controller 106 has successfully assigned the image to one of the classes using the machine learning algorithm in step S311, and determined that the path between the connectors 101, 111 is free from obstructions in step S312, then in step S313 the charging point controller 106 signals to the vehicle controller that a viable connection is possible. For example, the vehicle controller may respond by displaying a message or other form of notification to signal to the driver that the vehicle is correctly positioned.

Then, in step S316 the charging point controller 106 transmits instructions to the adjustment mechanism 103, which performs the requested adjustment in step S317. Once the adjustment has been completed, in step S318 the charging point controller 106 controls the engagement mechanism 108 to engage the first connector 101 with the second connector 111. The charging point controller 106 may carry out checks to confirm that a suitable connection has been established, for example by testing the resistance of the connection between the first and second connectors 101, 111 using the power circuit 107. Once the charging point controller 106 confirms that a connection has successfully been established, in step S319 the charging point controller 106 signals to the vehicle controller that connection has been successful. The power circuit 107 then begins the transfer of electrical power to or from the vehicle according to whether charging or discharging is required. For example, in some embodiments the power circuit may transfer power from the vehicle no to the grid at times of high demand on the grid, and may transfer power to the vehicle no at times of low demand. Once the desired transfer has been completed, the vehicle controller may notify the driver that the vehicle no is ready to be disengaged and driven in step S320.

Figure 4:
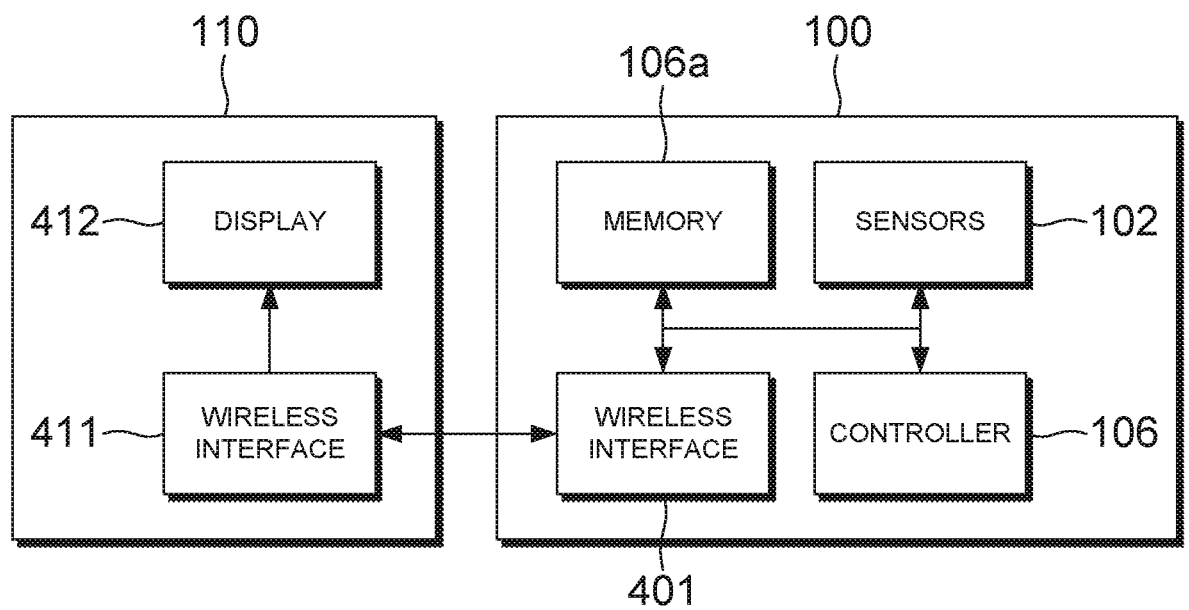
FIG. 4 illustrates a system enabling wireless communication between the electric vehicle and the apparatus of FIG. 1, according to an embodiment of the present invention.

Referring now to FIG. 4, a system enabling wireless communication between the electric vehicle and the apparatus of FIG. 1 is illustrated, according to an embodiment of the present invention. The apparatus 100 and the vehicle no each comprises a respective wireless interface 401, 411 to enable the apparatus 100 and vehicle no to communicate wirelessly with one another. Any suitable wireless communication technology may be used, as described above with reference to FIG. 3. The vehicle no also comprises a display 412, for example in the form of an integrated dash-mounted display screen or in the form of a portable device such as a tablet or smartphone. The display 412 may be used to display information to the driver as described above with reference to FIG. 3.

The apparatus 100 comprises the sensors 102 and charging point controller 106. The apparatus may also comprise other elements such as those shown in FIG. 1, which for the sake of clarity are not shown in FIG. 4. In the present embodiment the apparatus 100 further comprises computer-readable memory 106a which is arranged to store a plurality of predetermined adjustments each associated with one of the plurality of image classes, as described above. In some embodiments, instead of storing the predetermined adjustments in local memory 106a, the controller 106 may be configured to access remote storage, for example cloud-based storage, to retrieve the stored predetermined adjustments. Furthermore, in some embodiments some or all of the operations described as being carried out by a local controller 106 in the charging point apparatus 100, could instead be carried out at a controller remote from the charging point apparatus 100, for example at a cloud computing server. As such, references to a 'controller' herein should be construed accordingly, without implying that the corresponding processing steps must be carried out locally at the charging point apparatus 100.

The controller 106 may comprise one or more processors, and the memory 106a may store a computer program comprising instructions which, when executed the one or more processors, cause the controller 106 to perform any of the above-described methods. For example, the computer program instructions may cause the charging point controller 106 to classify an image captured by the one or more sensors 102 using a machine learning algorithm, retrieve the associated predetermined adjustment from the memory 106a, apply the necessary adjustment using the adjustment mechanism 103, and control the engagement mechanism 108 to engage the first connector 101 with the second connector 111.

Figure 5:
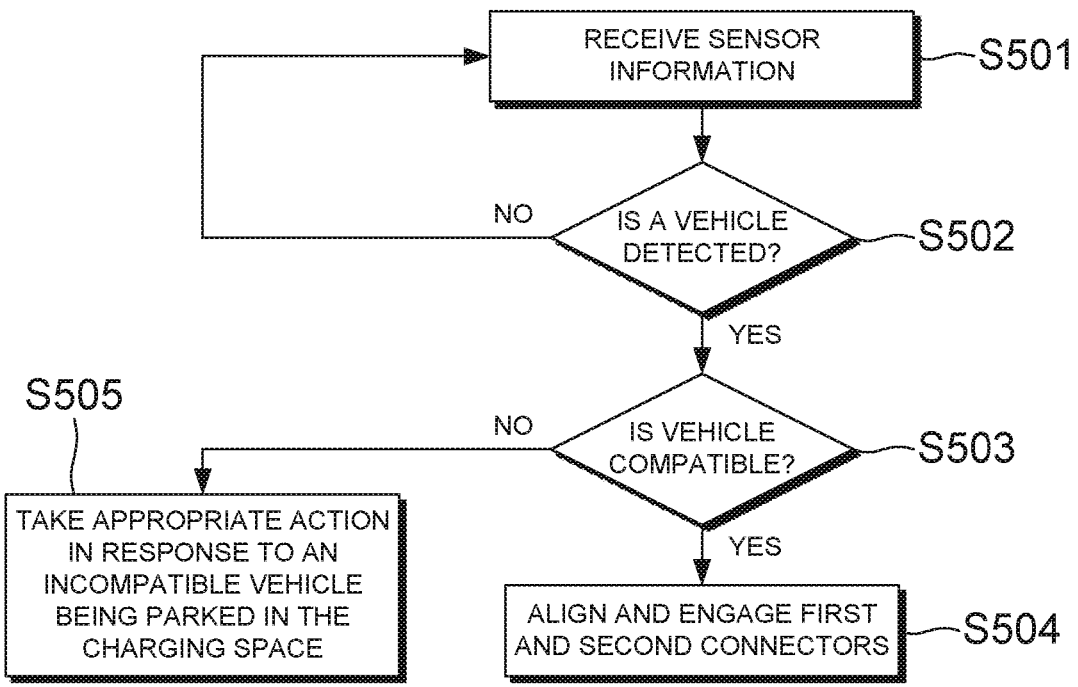
FIG. 5 is a flowchart illustrating a method of automatically taking action when a vehicle is improperly parked over the first connector, according to an embodiment of the present invention.

Referring now to FIG. 5, a flowchart showing a method of automatically taking action when a vehicle is improperly parked over the first connector is illustrated, according to an embodiment of the present invention. The method may be performed by apparatus such as those illustrated in FIGS. 1 and 4. First, in step S501 the controller 106 receives information from one or more of the sensors 102. Then, in step S502 the controller 106 determines whether a vehicle 110 is parked in the space over the first connector 101, based on the information received in step S501. For example, if the one or more sensors 102 includes a light sensor, the controller 106 may determine that a vehicle is parked in the space over the first connector 101 when the light level detected by the light sensor falls below a certain threshold, indicative of an object casting a shadow over the light sensor. If no vehicle is detected, the controller 106 waits and repeatedly checks the sensor information to determine whether a vehicle has been parked over the first connector 101.

Once a vehicle has been detected in step S502, the controller 106 proceeds to step S503 and checks whether the vehicle 110 is one that is compatible with the charging apparatus 100. For example, in step S502 the controller 106 may apply an image recognition algorithm to an image captured by the one or more sensors 102, to attempt to detect the second connector 111 on the vehicle 110. In some embodiments, the controller 106 may be capable of recognizing different types of vehicle based on information from the one or more sensors 102.

For example, the controller 106 may be configured to analyse information from the one or more sensors 102 to distinguish between electric vehicles and internal combustion engine vehicles. In some embodiments, the one or more sensors 102 include an air sensor for detecting a characteristic of air, and the controller 106 is configured to determine that the vehicle 110 is incompatible with the first connector 101 in dependence on the air sensor 102 detecting a characteristic indicative of an exhaust emission of an internal combustion engine vehicle. In some embodiments, the controller 106 may apply image recognition to an image of the underside of the vehicle to detect features which are indicative of an internal combustion engine vehicle, such as a fuel pump, exhaust pipe, catalytic converters, and so on. In response to one or more such features being detected, the controller 106 may determine in step S503 that the vehicle 110 is an internal combustion engine vehicle and is therefore incompatible with the charging apparatus 100.

In some embodiments, in step S503 the controller 106 may make the determination based on information received from the one or more sensors 102 after the vehicle 110 was detected in step S502. In other words, the controller 106 may receive new sensor information between steps S502 and S503 for determining whether a second connector 111 is present at the expected location. In other embodiments, the controller may use the same sensor information in both steps S502 and S503, in which case it may not be necessary to receive new sensor information between steps S502 and S503.

In step S503, if the controller 106 determines that the second connector 111 is present, the controller 106 may then proceed to step S504 and automatically align and connect the first and second connectors 101, 111 using the adjustment mechanism, as described above. If on the other hand the second connector 111 is not detected in step S503 while a vehicle is parked in the space above the first connector 101, the controller 106 proceeds to step S505 and automatically takes action in response to a vehicle having been improperly parked in the electric vehicle charging space. The action in step S505 may take different forms, depending on the embodiment. For example, in one embodiment the controller 106 may automatically issue an enforcement notice, such as a parking violation, or may alert a suitable authority to the presence of an improperly parked vehicle. In another embodiment, the controller 106 may activate an audio or visual alarm in or near to the parking space above the first connector 101. For example, in a situation in which a driver of an incompatible vehicle 110 is unaware that the space in which they are parked is an electric vehicle charging space, activating an alarm to alert a driver of the vehicle 110 to the presence of the electric vehicle charging space may prompt them to move the vehicle 110 out of the parking space, freeing up the space for users of compatible electric vehicles.

In some embodiments the action that is taken in step S505 may be predetermined. In other embodiments the action may be context-dependent, for example by choosing one of a plurality of predetermined actions according to information received from the one or more sensors and/or other factors. In one such embodiment the controller 106 may take different predetermined actions at different times of day, for example by activating an alarm as described above during daylight hours, whilst taking less obtrusive action at night to avoid disturbing nearby residents, such as silently alerting an enforcement is authority or issuing a parking violation notice.

Whilst certain embodiments of the invention have been described herein with reference to the drawings, it will be understood that many variations and modifications will be possible without departing from the scope of the invention as defined in the accompanying claims.

The invention claimed is:

1. Apparatus for transferring electrical power to or from an electric vehicle, comprising:
    a first connector engageable with a second connector on an electric vehicle, the first connector being disposed beneath a space in which the electric vehicle may be parked;
    one or more sensors configured to detect a current position of the second connector relative to the first connector, wherein the one or more sensors are disposed so as to capture an image of the underside of the electric vehicle when the electric vehicle is situated in the space above the first connector;
    an adjustment mechanism configured to adjust a position of the first connector;
    a controller configured to receive information from the one or more sensors indicative of the current position of the first connector relative to the second connector, determine an adjustment required to align the first connector with the second connector in dependence on the information received from the one or more sensors, control the adjustment mechanism in accordance with the determined adjustment to align the first and second connectors, and engage the first connector with the second connector once aligned to thereby make an electrical connection for transferring electrical power to or from the electric vehicle; and a power circuit configured to transfer electrical power to or from the electric vehicle via said electrical connection, wherein the controller is configured to use a machine learning algorithm to assign the captured image to one of a plurality of image classes each corresponding to a different position of the second connector in the captured image, and is configured to determine the required adjustment by retrieving a stored predetermined adjustment associated with the assigned image class.

2. The apparatus of claim 1, wherein one or more of the controller, power circuit, adjustment mechanism and one or more sensors are disposed beneath a ground level of the space in which the electric vehicle may be parked.

3. The apparatus of claim 1, comprising:
a connector housing in which the first connector is installed,
wherein an uppermost surface of the connector housing is disposed at or below a ground level of the space in which the electric vehicle may be parked.

4. The apparatus of claim 1, wherein the apparatus is configured to transmit the captured image to the electric vehicle in which the electric vehicle is being parked in the space above the first connector, to assist a user of the electric vehicle in approximately aligning the second connector with the first connector, and/or
wherein the captured image comprises an image captured at visible wavelengths, or an infrared image, or an ultrasound image.

5. The apparatus of claim 4, wherein the apparatus is configured to transmit information indicative of a range of the adjustment mechanism to the electric vehicle.

6. The apparatus of claim 5, wherein the information indicative of a range of the adjustment mechanism comprises a bounding box overlaid on the captured image to indicate an area within which the first connector is capable of being positioned by the adjustment mechanism.

7. The apparatus of claim 1, wherein the controller is configured to determine whether the electric vehicle is positioned such that the second connector is beyond a range of the adjustment mechanism, and is configured to transmit a misalignment notification message to the electric vehicle in dependence on a determination that the second connector is beyond a range of the adjustment mechanism.

8. The apparatus of claim 1, comprising:
means for detecting and/or removing an obstruction from a path between the first and second connectors.

9. The apparatus of claim 1, wherein the first connector is configured to be extendable in a first direction towards the second connector to engage the first connector with the second connector, and
wherein the adjustment mechanism is configured to move the first connector in a plane inclined with respect to the first direction to adjust the position of the first connector.

10. The apparatus of claim 1, wherein the electric vehicle is an automobile.

11. The apparatus of claim 1, wherein the controller is configured to determine whether a vehicle parked in the space above the first connector is compatible with the first connector, and to automatically take an action in response to a determination that the vehicle is incompatible with the first connector.

12. The apparatus of claim 11, wherein the controller is configured to analyse an image captured by the one or more sensors to determine whether the vehicle is an internal combustion engine vehicle, and is configured to determine that the vehicle is incompatible with the first connector in dependence on a determination that the vehicle is an internal combustion engine vehicle.

13. The apparatus of claim 12, wherein the controller is configured to apply an image recognition algorithm to the image captured by the one or more sensors to detect one or more features indicative of an internal combustion engine vehicle.

14. The apparatus of claim 11, wherein the one or more sensors include an air sensor for detecting a characteristic of air, and the controller is configured to determine that the vehicle is incompatible with the first connector in dependence on the air sensor detecting a characteristic indicative of an exhaust emission of an internal combustion engine vehicle.

15. The apparatus of claim 11, wherein the action comprises one or more of:
activating an alarm;
automatically issuing a parking violation notice; and
alerting an authority to the presence of an incompatible vehicle in the space.

16. A control method of an electric vehicle charging apparatus comprising a first connector engageable with a second connector on an electric vehicle, the first connector being disposed beneath a space in which the electric vehicle may be parked, one or more sensors configured to detect a current position of the second connector relative to the first connector, an adjustment mechanism configured to adjust a position of the first connector, and a power circuit configured to transfer electrical power to or from the electric vehicle, wherein the one or more sensors are disposed so as to capture an image of the underside of the electric vehicle when the electric vehicle is situated in the space above the first connector, the method comprising:
receiving information from the one or more sensors indicative of the current position of the first connector relative to the second connector;
determining an adjustment required to align the first connector with the second connector in dependence on the information received from the one or more sensors, by using a machine learning algorithm to assign the captured image to one of a plurality of image classes each corresponding to a different position of the second connector in the captured image, and is configured to determine the required adjustment by retrieving a stored predetermined adjustment associated with the assigned image class;
controlling the adjustment mechanism in accordance with the determined adjustment to align the first and second connectors;
engaging the first connector with the second connector once aligned to thereby make an electrical connection for transferring electrical power to or from the electric vehicle; and
transferring electrical power to or from the electric vehicle via said electrical connection, using the power circuit.

17. A computer program comprising instructions which, when executed by one or more processors, cause performance of a method according to claim 16.

18. A non-volatile computer-readable storage medium having stored thereon a computer program according to claim 17.

\* \* \* \* \*